(12) United States Patent
Ikkink et al.

(10) Patent No.: US 8,150,639 B2
(45) Date of Patent: Apr. 3, 2012

(54) MAGNETIC FIELD SENSOR

(75) Inventors: Teunis Ikkink, Geldrop (NL); Hans Boeve, Hechtel-Eksel (BE)

(73) Assignee: NXP B.V., Eindhoven (NL)

( * ) Notice: Subject to any disclaimer, the term of this patent is extended or adjusted under 35 U.S.C. 154(b) by 372 days.

(21) Appl. No.: 12/306,028

(22) PCT Filed: May 25, 2007

(86) PCT No.: PCT/IB2007/051981
§ 371 (c)(1),
(2), (4) Date: Dec. 22, 2008

(87) PCT Pub. No.: WO2007/148247
PCT Pub. Date: Dec. 27, 2007

(65) Prior Publication Data
US 2009/0281739 A1    Nov. 12, 2009

(30) Foreign Application Priority Data
Jun. 21, 2006  (EP) .................................. 06115787

(51) Int. Cl.
*G01C 17/38* (2006.01)
(52) U.S. Cl. ......................................... 702/57
(58) Field of Classification Search ............. 702/57
See application file for complete search history.

(56) References Cited

U.S. PATENT DOCUMENTS

| | | | |
|---|---|---|---|
| 4,953,305 A | | 9/1990 | Van Lente et al. |
| 5,511,319 A | * | 4/1996 | Geerlings et al. ............ 33/356 |
| 6,047,237 A | * | 4/2000 | Michmerhuizen ............ 701/224 |
| 6,286,222 B1 | | 9/2001 | Voto et al. |
| 6,487,500 B2 | * | 11/2002 | Lemelson et al. ............ 701/301 |
| 6,543,146 B2 | | 4/2003 | Smith et al. |
| 6,754,584 B2 | * | 6/2004 | Pinto et al. .................... 701/200 |
| 6,956,525 B1 | | 10/2005 | Chang |
| 7,451,549 B1 | * | 11/2008 | Sodhi et al. ..................... 33/356 |
| 2002/0100178 A1 | * | 8/2002 | Smith et al. ..................... 33/356 |
| 2003/0140510 A1 | | 7/2003 | Woods et al. |
| 2004/0254727 A1 | * | 12/2004 | Ockerse et al. ............... 701/224 |
| 2006/0053644 A1 | | 3/2006 | Currie et al. |
| 2006/0247847 A1 | * | 11/2006 | Carter et al. .................. 701/200 |
| 2007/0109185 A1 | * | 5/2007 | Kracke et al. ............ 342/357.09 |
| 2010/0309008 A1 | * | 12/2010 | Laaksonen .................... 340/657 |

FOREIGN PATENT DOCUMENTS

EP    1318381 A2    6/2003
JP    2006-053081 A    2/2006

* cited by examiner

*Primary Examiner* — Cindy H Khuu

(57) ABSTRACT

Magnetic field sensors (1) comprising field detectors (10) for detecting magnetic fields are provided with environment detectors (11) for detecting environments and with processors (12) for, in response to detected environments, performing processes such as loading calibration parameter sets and (re) calibrations for the field detectors (10), to allow the magnetic field sensors (1) to be used in different subsequent environments. The environment detectors (11) may comprise code detectors for detecting codes indicative for environments and may comprise user interfaces (13) for, in response to detected environments and via user interactions, selecting processes to be performed by the processors (12). Devices (2) comprise magnetic field sensors (1). Apparatuses (3) such as cradles removably fix the devices (2) and may comprise code generators (30) for generating the codes indicative for the environments.

15 Claims, 3 Drawing Sheets

MAGNETIC FIELD SENSOR

FIELD OF THE INVENTION

The invention relates to a magnetic field sensor, and also relates to a device, to an apparatus, to a method for magnetic field sensing, to a computer program product and to a medium.

Examples of such a magnetic field sensor are geomagnetic field sensors, and examples of such a device are compasses and mobile terminals comprising compasses.

BACKGROUND OF THE INVENTION

A prior art magnetic field sensor is known from U.S. Pat. No. 6,047,237, which discloses in general a compass pre-calibration method and more in particular a method of installing an electronic compass including mounting the electronic compass in a vehicle and downloading pre-calibration data into the electronic compass. This pre-calibration data may be selected corresponding to identified vehicle characteristics.

The known magnetic field sensor is disadvantageous, inter alia, owing to the fact that it is designed to be installed in a vehicle in a non-removable way. The known magnetic field sensor is therefore designed to be used for relatively few purposes (inside one and the same vehicle).

SUMMARY OF THE INVENTION

It is an object of the invention, inter alia, to provide a magnetic field sensor that can be used for relatively many purposes.

Further objects of the invention are, inter alia, to provide a device, an apparatus, a method for magnetic field sensing, a computer program product and a medium that can be used for relatively many purposes.

The magnetic field sensor according to the invention comprises:

a field detector for detecting a magnetic field and for, in response to a field detection result, outputting an indication signal, an environment detector for detecting an environment and for, in response to a first environment detection result, outputting a first result signal and for, in response to a second environment detection result different from the first environment detection result, outputting a second result signal different from the first result signal, and a processor for, in response to the first result signal, performing a first process for the field detector and for, in response to the second result signal, performing a second process for the field detector, which second process is different from the first process.

The field detector detects a magnetic field. In response to a field detection result, an indication signal is outputted. This indication signal is for example converted into a graphical pointer signal or into a numerical display signal. To be able to use the magnetic field sensor for relatively many purposes, the environment detector has been added. This environment detector detects an environment of the magnetic field sensor. In response to a first environment detection result indicative for a detection of a first environment, a first result signal is outputted, and, in response to a second environment detection result indicative for a detection of a second environment different from the first environment, a second result signal is outputted. These result signals are supplied to the processor that, in response to the first result signal, performs a first process for the field detector and that, in response to the second result signal, performs a second process for the field detector. So, in response to a detection of a particular environment, the processor performs a particular process for the field detector. This allows the magnetic field sensor to be used in different subsequent environments and therefore for relatively many purposes (inside different cars, on (motor)bikes, by pedestrians on the street, by pedestrians in trains etc.), without compromising an accuracy of the magnetic field sensor output.

The magnetic field sensor according to the invention is further advantageous, inter alia, in that it is more independent and self-supporting. Compared to the known magnetic field sensor that has to receive its pre-calibration data from a plant, the magnetic field sensor according to the invention has got the capability to investigate its environment on its own.

An embodiment of the magnetic field sensor according to the invention is defined by at least one of the processes comprising the loading of a calibration parameter set. In response to a particular environment detection result indicative for a detection of a particular environment, a particular calibration parameter set is loaded. This particular calibration parameter set may be loaded from a memory located inside or outside the magnetic field sensor and may result from a particular calibration performed for this particular environment in the past. The loading of the calibration parameter set is for example done to compensate the field detector.

An embodiment of the magnetic field sensor according to the invention is defined by at least one of the processes comprising a calibration or a recalibration of the field detector. In response to a particular environment detection result indicative for a detection of a particular environment, a particular calibration or a particular recalibration is performed, for example to compensate the field detector. The particular calibration is for example performed in case the particular environment has not been detected before. The particular recalibration is for example performed in case the particular environment has been detected more than a particular time interval ago.

So, the first and second processes may comprise the loading of a first calibration parameter set and a second calibration parameter set and may comprise a first (re)calibration and a second (re)calibration and may comprise the loading of the first calibration parameter set and the second (re)calibration and may comprise the first (re)calibration and the loading of the second calibration parameter set. In other words, a process comprises at least one of loading a calibration parameter set and performing a calibration and performing a recalibration.

An embodiment of the magnetic field sensor according to the invention is defined by the environment detector being arranged to, in response to a third environment detection result, outputting a third result signal different from the first and second result signals, and the processor being arranged to, in response to the third result signal, performing a third process for the field detector, which third process is different from the first and second processes. The first and second and third processes may comprise the loading of first and second and third calibration parameter sets and may comprise first and second and third (re)calibrations and may comprise combinations of the loading of one or more calibration parameter sets and one or more (re)calibrations.

An embodiment of the magnetic field sensor according to the invention is defined by the environment detector comprising a code detector for detecting a code indicative for the environment. Thereto, a code generator for generating this code may be located outside the magnetic field sensor. In response to a detected code that is known to the magnetic field sensor, the magnetic field sensor may load a calibration parameter set from a memory located inside or outside the magnetic field sensor, which calibration parameter set may depend on the detected code. In response to a detected code that is not known to the magnetic field sensor, the magnetic field sensor may start a (re)calibration.

The magnetic field sensor may rely on (signals from) an accelerometer (that measures a gravity vector) to for example perform a (re)calibration. The accelerometer can be part of the magnetic field sensor.

An embodiment of the magnetic field sensor according to the invention is defined by further comprising:

a user interface for, in response to at least one result signal, selecting at least one process to be performed by the processor.

The user interface may comprise an output part such as a display or a loudspeaker for outputting information destined for a user, for example to ask a question to the user such as "do you want to load this calibration parameter set" or "do you want a (re)calibration to be performed". The user interface may further comprise an input part such as a keyboard or a mouse or a microphone or a touch screen for inputting information originating from the user, for example to receive a response to the question.

The device according to the invention comprises the magnetic field sensor according to the invention. The apparatus according to the invention removably fixes the device according to the invention. Thereto, the apparatus may comprise a fixation for removably fixing the device. The fixation may comprise a hook or a recess etc. Alternatively, the apparatus may comprise a vehicle with a fixation such as a vehicle with a hook or a recess.

An embodiment of the apparatus according to the invention is defined by the apparatus being a cradle and the device being insertable into the cradle. The cradle is an advantageous embodiment of the fixation owing to the fact that it fixes a position as well as an orientation of the device. Alternatively, the apparatus may comprise a vehicle with a cradle.

An embodiment of the apparatus according to the invention is defined by further comprising a code generator for generating a code indicative for the environment. Thereto, the magnetic field sensor may comprise a code detector for detecting the code. The code generator may be located inside or outside the fixation.

The method according to the invention for magnetic field sensing comprises the steps of detecting a magnetic field and, in response to a field detection result, outputting an indication signal, detecting an environment and, in response to a first environment detection result, outputting a first result signal and, in response to a second environment detection result different from the first environment detection result, outputting a second result signal different from the first result signal, and in response to the first result signal, performing a first process for the field detection and, in response to the second result signal, performing a second process for the field detection, which second process is different from the first process.

The computer program product according to the invention performs the steps of the method according to the invention. Such a computer program product may comprise software.

The medium according to the invention stores and comprises the computer program product according to the invention. Such a medium may comprise a data carrier or a memory for storing and comprising the software.

Embodiments of the device according to the invention and of the apparatus according to the invention and of the method according to the invention and of the computer program product according to the invention and of the medium according to the invention correspond with the embodiments of the magnetic field sensor according to the invention.

U.S. Pat. No. 6,047,237 does not disclose a magnetic field sensor comprising an environment detector for detecting an environment and comprising a processor for, in response to a detection, performing a process for the field detector. U.S. Pat. No. 6,543,146 discloses an electronic compass and compensation of large magnetic errors for operation over all orientations, and US 2006/0053644 discloses a compass orientation compensation. Both disclosures do not disclose a magnetic field sensor comprising an environment detector for detecting an environment and comprising a processor for, in response to a detection, performing a process for the field detector.

The invention is based upon an insight, inter alia, that a non-removable magnetic field sensor comprising a field detector for detecting a magnetic field is designed to be used for one purpose only, and is based upon a basic idea, inter alia, that an environment detector is to be added for detecting an environment and that a processor is to be used for, in response to a detection, performing a process for the field detector, to allow the magnetic field sensor to be used for more than one purpose (in more than one environment).

The invention solves the problem, inter alia, to provide a magnetic field sensor that can be used for relatively many purposes. The magnetic field sensor according to the invention is further advantageous, inter alia, in that it is more independent and self-supporting.

These and other aspects of the invention will be apparent from and elucidated with reference to the embodiments(s) described hereinafter.

DETAILED DESCRIPTION OF EMBODIMENTS

Figure 1:
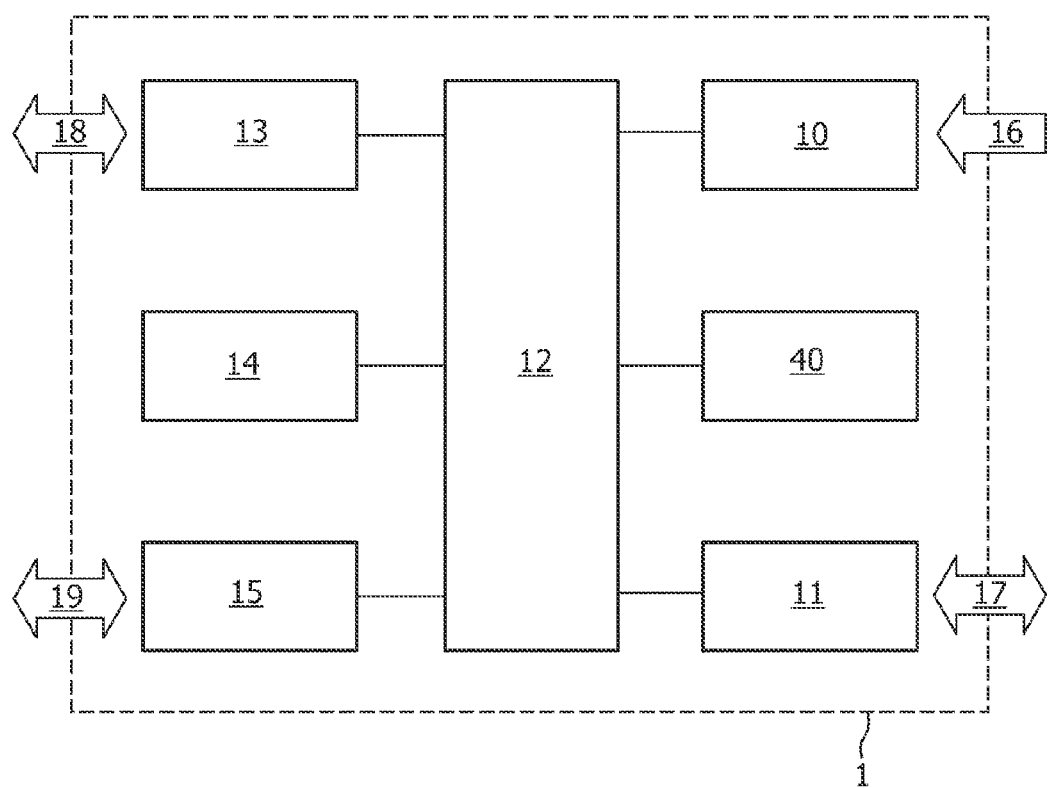
FIG. 1 shows diagrammatically a magnetic field sensor according to the invention.

The magnetic field sensor 1 according to the invention shown in FIG. 1 comprises a field detector 10 for detecting a magnetic field and for, in response to a field detection result, outputting an indication signal. The magnetic field sensor 1 further comprises an environment detector 11 for detecting an environment and for, in response to a first environment detection result, outputting a first result signal and for, in response to a second environment detection result different from the first environment detection result, outputting a second result signal different from the first result signal. The magnetic field sensor 1 further comprises a processor 12 coupled to the field detector 10 and to the environment detector 11 for, in response to the first result signal, performing a first process for the field detector 10 and for, in response to the second result signal, performing a second process for the field detector 10, which second process is different from the first process.

The magnetic field sensor 1 may further comprise a user interface 13 coupled to the processor 12. This user interface 13 may comprise for example an output part such as a display or a loudspeaker for outputting information destined for a user, for example to ask a question to the user such as "do you want to load this calibration parameter set" or "do you want a (re)calibration to be performed" and may further comprise for example an input part such as a keyboard or a mouse or a microphone or a touch screen for inputting information originating from the user, for example to receive a response to the question. The output part may further be used for displaying the indication signal originating from the field detector 10. This indication signal may be processed by the processor 12 before being displayed. The magnetic field sensor 1 may further comprise a memory 14 for storing one or more calibration parameter sets and may further comprise a device interface 15 for interfacing a part of a device further described via the FIG. 2. The magnetic field sensor 1 may further comprise an accelerometer 40 for example coupled to the processor 12, and the magnetic field sensor 1 may rely on (signals from) the accelerometer 40 (that measures a gravity vector) to for example perform a (re)calibration.

In the FIG. 1, an arrow 16 indicates that magnetic field information is received by the field detector 10, and an arrow 17 indicates that environment information is received by the environment detector 11 and that possibly trigger information is sent by the environment detector 11 for triggering a transmission of the environment information. Alternatively, possible trigger information for triggering a transmission of the environment information may be generated by a trigger generator different from the environment detector 11 and not shown. An arrow 18 indicates that output information may be outputted by the user interface 13 and that input information may be inputted into the user interface 13, and an arrow 19 indicates that device information may be outputted by the device interface 15 into the device and that device information originating from the device may be inputted into the device interface 15.

Figure 2:
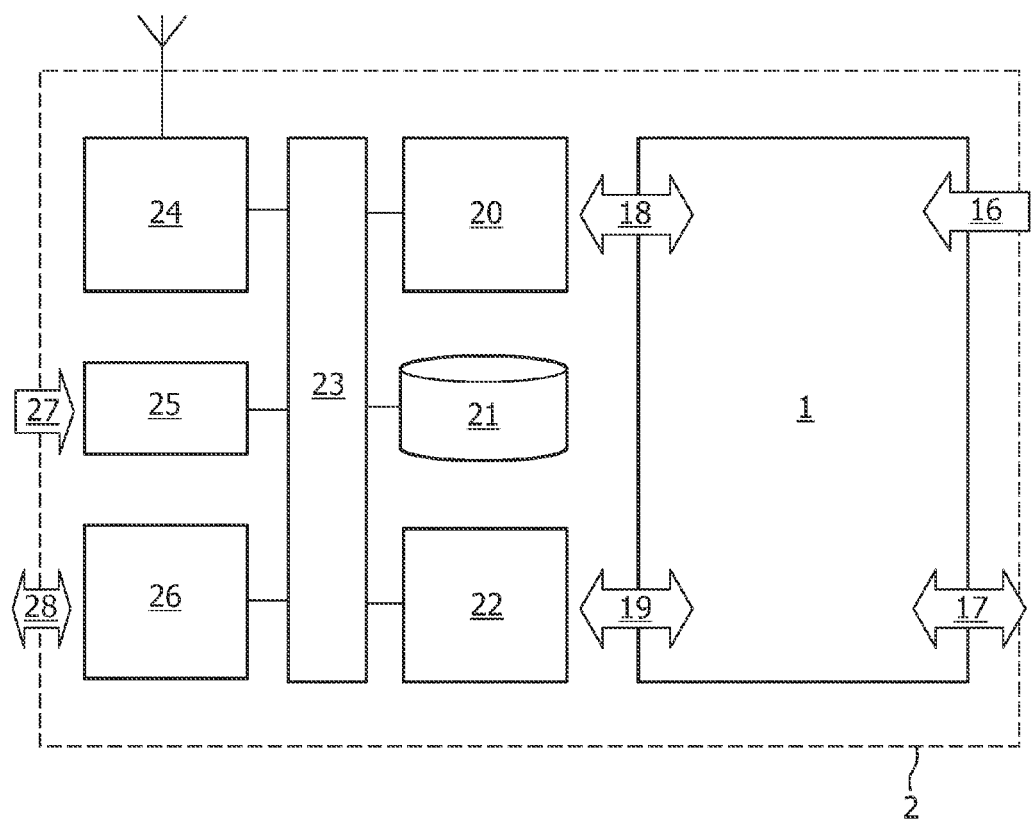
FIG. 2 shows diagrammatically a device according to the invention comprising a magnetic field sensor according to the invention.

The device 2 according to the invention shown in the FIG. 2 comprises the magnetic field sensor 1 that together with its content and its possible incoming and outgoing information as indicated by the arrows 16-19 already has been described for the FIG. 1. The device 2 may further comprise a device user interface 20, a device memory 21, a further device interface 22, a transceiver 24, a camera 25 and an apparatus interface 26 all coupled to a device processor 23.

Figure 3:
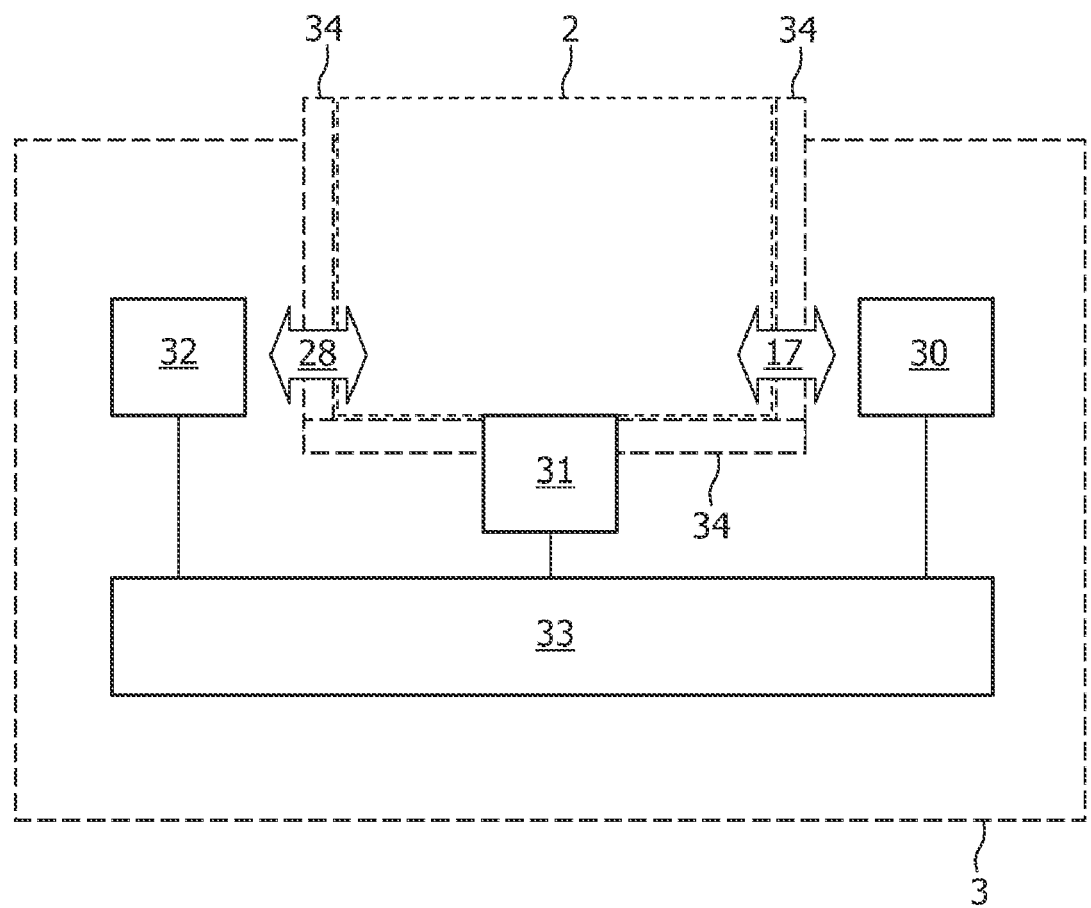
FIG. 3 shows diagrammatically an apparatus according to the invention for removably fixing a device according to the invention.

In the FIG. 2, an arrow 27 indicates that camera information is received by the camera 25, and an arrow 28 indicates that apparatus information may be outputted by the apparatus interface 26 into an apparatus further described via the FIG. 3 and that apparatus information originating from the apparatus may be inputted into the apparatus interface 26.

The device 2 as shown in the FIG. 2 is for example a mobile phone with a camera and further comprising the magnetic field sensor 1 such as an electronic compass. For efficiency reasons, both user interfaces 13 and 20 might be integrated into one user interface, both memories 14 and 21 might be integrated into one memory, and both device interfaces 15 and 22 might be avoided in case both processors 12 and 23 can communicate directly with each other. Further, both processors 12 and 23 might be integrated into one processor.

Alternatively, the device 2 might be a digital camera comprising the magnetic field sensor 1 such as an electronic compass, in which case usually the transceiver 24 might be avoided, or the device 2 might be a GPS receiver comprising the magnetic field sensor 1 such as an electronic compass and further comprising one or more GPS units etc. The device 2 might even be an electronic compass comprising the magnetic field sensor 1 in a housing not shown and not comprising any mobile phone units or GPS units etc.

The apparatus 3 according to the invention comprises for example a frame 34 for removably fixing a device 2 according to the invention and further comprises a code generator 30, a device detector 31 and a further apparatus interface 32 all coupled to an apparatus processor 33. The apparatus 3 as shown in the FIG. 3 is for example a cradle or may be a vehicle comprising a cradle etc. However, other fixations that fix a position and an orientation of the magnetic field sensor 1 and/or the device 2 are not to be excluded, such as for example recesses in (dashboards of) vehicles.

In the FIG. 3, an arrow 17 indicates that environment information such as a code indicative for the environment is transmitted from the code generator 30 to the device 2 and that possibly trigger information is received by the code generator 30 for triggering a transmission of the environment information, and an arrow 28 indicates that apparatus information may be outputted by the device 2 to the further apparatus interface 32 and that apparatus information may be inputted from the further apparatus interface 32 into the device 2. For example in case of the device 2 being a mobile phone, the further apparatus device 32 may comprise and/or be coupled to a hands free set etc.

In case the device 2 is shifted into the apparatus 3, the device detector 31 will detect this, for example by detecting a wired coupling or a wireless coupling between the device 2 and the apparatus 3, and will inform the apparatus processor 33. The apparatus processor will activate the code generator 30 that starts generating a code indicative for the environment (this time, the environment being the apparatus 3). Alternatively, the device detector 31 may be avoided, with the code generator 30 being activated independently from a device detection, for example via an ignition key, or being activated all the time.

The environment detector 11 for example comprises a code detector for detecting the code, and informs the processor 12 by, in response to a first environment detection result, outputting a first result signal. In response to the first result signal, the processor 12 for example loads a calibration parameter set, in correspondence with the first result signal, from the memory 14 and/or from the device memory 21, in case a calibration has been made before, or may order the field detector 10 to load a calibration parameter set from the memory 14 and/or from the device memory 21, in case a calibration has been made before. Alternatively, the processor 12 may perform a calibration of the field detector 10 in case a calibration has not been made before or may perform a recalibration in case a calibration has been made more than a particular time interval ago or may order the field detector 10 to calibrate or recalibrate itself etc.

Alternatively, the environment detector 11 may comprise a metal detector for detecting an amount of metal, with a changed amount of metal being an indication that a (re)calibration needs to be performed etc.

In addition, via the user interface 13 and/or the device user interface 20, information destined for a user can be outputted, for example to ask a question to the user such as "do you want to load this calibration parameter set" or "do you want a (re)calibration to be performed" and information originating from the user can be inputted, for example to receive a response to the question etc. In other words, the user interface 13 and/or the device user interface 20 make user interactions possible.

In case the device 2 is shifted into a different apparatus not shown, the environment detector 11 will detect this and will inform the processor 12 by, in response to a second environment detection result different from the first environment detection result, outputting a second result signal different from the first result signal. In response to the second result signal, the processor 12 for example loads or orders the field detector 10 to load a different calibration parameter set from the memory 14 and/or from the device memory 21 or may perform a (re)calibration of the field detector 10 or may order the field detector 10 to calibrate or recalibrate itself etc. as described above.

In case the device 2 is not shifted into an apparatus but is for example used by a pedestrian on the street or in a train, the environment detector 11 will detect this by either not detecting a particular environment at all or by detecting a particular environment (a changed amount of metal as detected inside the train or a detected code generated by a code generator inside the train etc.) and will inform the processor 12 by, in response to a third environment detection result different from the first and second environment detection results, outputting a third result signal different from the first and second result signals. In response to the third result signal, the processor 12 for example loads or orders the field detector 10 to load a further different calibration parameter set from the memory 14 and/or from the device memory 21 or may perform a further (re)calibration of the field detector 10 or may order the field detector 10 to further calibrate or further recalibrate itself etc. as described above.

Summarizing, magnetic field sensors 1 comprising field detectors 10 for detecting magnetic fields are provided with environment detectors 11 for detecting environments and with processors 12 for, in response to detected environments, performing processes such as loading calibration parameter sets and (re)calibrations for the field detectors 10, to allow the magnetic field sensors 1 to be used in different subsequent environments. The environment detectors 11 may comprise code detectors for detecting codes indicative for environments and may comprise user interfaces 13 for, in response to detected environments and via user interactions, selecting processes to be performed by the processors 12. Devices 2 comprise magnetic field sensors 1. Apparatuses 3 such as cradles removably fix the devices 2 and may comprise code generators 30 for generating the codes indicative for the environments.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A magnetic field sensor comprising:
   a field detector, comprising an accelerometer, for detecting a magnetic field and for, in response to a field detection result, outputting an indication signal;
   a code generator for generating a code indicative for a magnetic environment;
   an environment detector comprising a code detector for detecting the code indicative for the magnetic environment and for, in response to a first environment detection result, outputting a first result signal and for, in response to a second environment detection result different from the first environment detection result, outputting a second result signal different from the first result signal; and
   a processor for, in response to the first result signal, performing a first process for the field detector and for, in response to the second result signal, performing a second process for the field detector, which second process is different from the first process.

2. The magnetic field sensor according to claim 1, wherein at least one of the processes comprises the loading of a calibration parameter set.

3. The magnetic field sensor according to claim 1, wherein at least one of the processes comprises a recalibration of the field detector based upon signals from the accelerometer.

4. The magnetic field sensor according to claim 1, the environment detector being arranged to, in response to a third environment detection result, outputting a third result signal different from the first and second result signals, and the processor being arranged to, in response to the third result signal, performing a third process for the field detector, which third process is different from the first and second processes.

5. The magnetic field sensor according to claim 1, further comprising:
   a user interface for, in response to at least one result signal, selecting at least one process to be performed by the processor.

6. The magnetic field sensor of claim 5, wherein the user interface further comprises a display.

7. The magnetic field sensor of claim 5, wherein the user interface further comprises a loudspeaker.

8. The magnetic field sensor of claim 5, wherein the user interface displays the indication signal from the field detector.

9. A device comprising the magnetic field sensor according to claim 1.

10. An apparatus for removably fixing the device according to claim 9.

11. The apparatus according to the claim 10, the apparatus being a cradle and the device being insertable into the cradle.

12. The magnetic field sensor of claim 1, wherein the environment detector further comprises a metal detector.

13. The magnetic field sensor of claim 12, wherein detection of a changed amount of metal by the metal detector prompts a recalibration.

14. A method for magnetic field sensing, comprising the steps of:
   detecting a magnetic field with a magnetic field sensor comprising an accelerometer;
   in response to a magnetic field detection result, outputting an indication signal;
   generating a code indicative of a magnetic environment;
   detecting the code indicative of the magnetic environment;
   in response to a first environment detection result, outputting a first result signal;
   in response to a second environment detection result different from the first environment detection result, outputting a second result signal different from the first result signal;
   in response to the first result signal, performing a first process for the field detection; and
   in response to the second result signal, performing a second process for the field detection, which second process is different from the first process.

15. A non-transitory computer readable medium containing computer instructions stored therein for causing a computer processor to perform the steps of the method according to claim 14.

* * * * *